Patented July 26, 1949

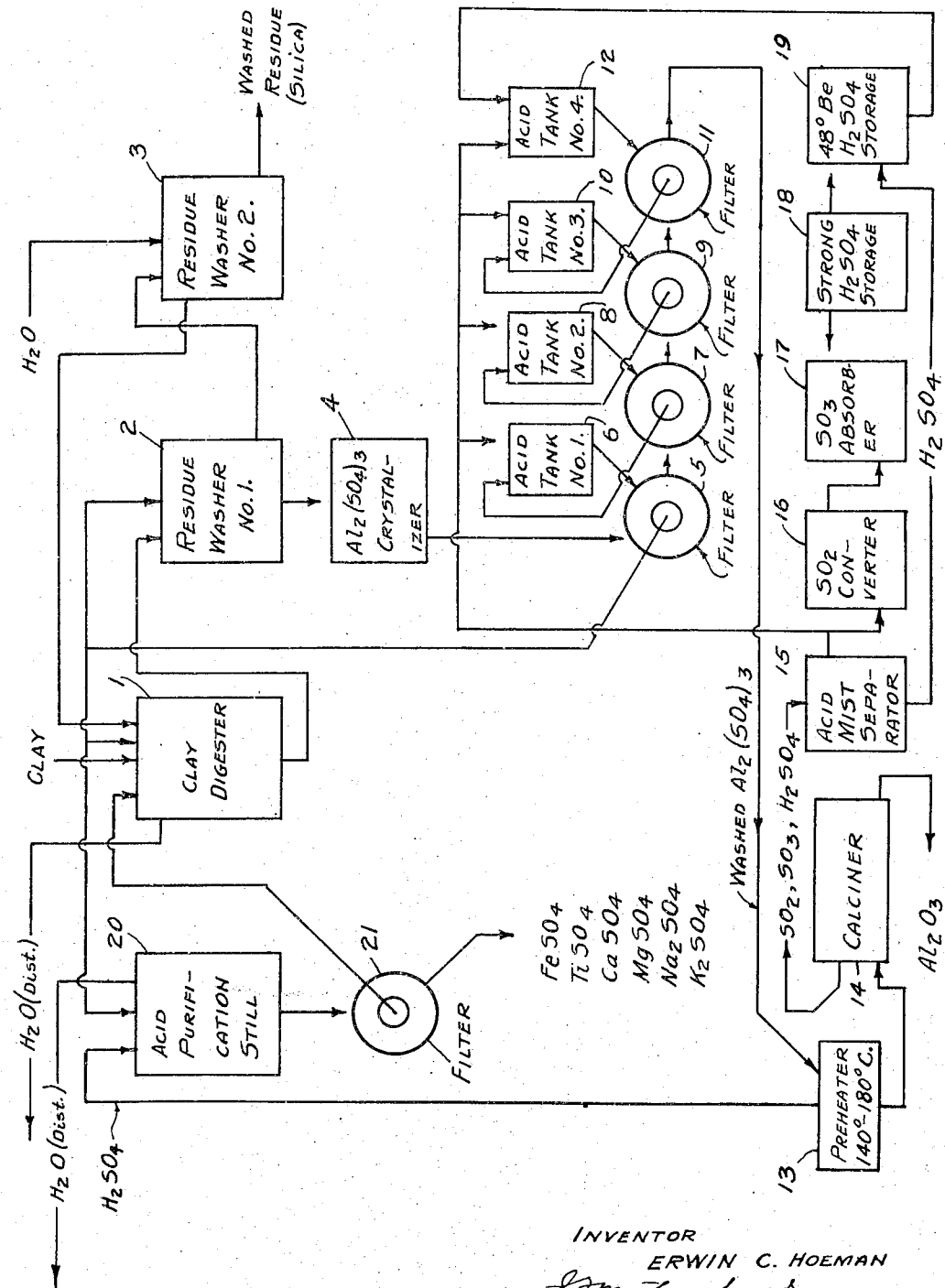

2,476,979

UNITED STATES PATENT OFFICE 2,476,979

PROCESS FOR PREPARING ALUMINA FROM CLAYS AND OTHER SILICATES OF ALUMINUM

Erwin C. Hoeman, Columbus, Ohio

Application August 21, 1945, Serial No. 611,906

6 Claims. (Cl. 23—123)

(Granted under the act of March 3, 1883, as amended April 30, 1928; 370 O. G. 757)

The invention described herein may be manufactured and used by or for the Government of the United States for governmental purposes without the payment to me of any royalty thereon, in accordance with the provisions of the act of April 30, 1928 (Ch. 460, 45 Stat. L. 467).

This invention relates to the manufacture of commercially pure alumina from clays and other silicates of aluminum. More particularly, it relates to such a process in which the clay or other silicate is digested by a relatively strong aqueous sulfuric acid solution to produce aluminum sulfate which is converted to alumina by calcination.

The production of aluminum sulfate by the digestion of aluminum minerals, for example aluminum silicate, in aqueous sulfuric acid is well known. Similarly, the conversion of aluminum sulfate to alumina by calcination is also old in the art.

The present invention contemplates the production of commercially pure alumina by means of an improved cyclical process involving the treatment of silicates with a strong sulfuric acid solution and the purification of the resulting aluminum sulfate.

The process of this invention does not require calcination of the clay or silicate as in the processes of the prior art. The clay or equivalent material is crushed or ground to a suitable size, 4 to 65 mesh.

Among the objects of this invention is the provision of a novel method for purification of the sulfuric acid solution by removing the metallic impurities, thus providing for the reuse of the acid with accompanying economy in operation.

The invention also provides a new method for the purification of the aluminum sulfate crystals resulting from the acid treatment of the clay, by washing the same with strong sulfuric acid solution, as distinguished from the use of dilute solutions as shown in the prior art.

Still another feature of this process is the provision of a new method for the conversion of acid aluminum sulfate into normal aluminum sulfate and the recovery of the liberated sulfuric acid and sulfur oxides.

Other objects and features of the invention will be apparent to those skilled in the art from description hereinafter given.

A preferred embodiment of the invention has been selected for purposes of illustration and description and is shown in the accompanying drawing, forming a part of the specification, herein.

The figure is a flow sheet illustrating in diagrammatic form the preferred method of carrying out the invention.

Clay or other silicate of aluminum, which need not be calcined, as in most other sulfuric acid processes, is crushed or ground to a suitable particle size. The clay is dried to the degree required to permit crushing. The process does not require crushing to finer than $\frac{1}{4}$ inch sieve size. Air dried clay, crushed to pass through 65-mesh, 20-mesh or 4-mesh sieves may be used with equally good results.

The clay is charged into a clay digester 1, shown diagrammatically in Fig. 1 of the accompanying drawing, where it is digested with a sulfuric acid solution which is preferably maintained at a concentration of about 48° Bé. The digester is supplied with digest acid from filter 5 and with filtered concentrated acid from acid purification still 20 and filter 21. The ratio of purified acid to the remainder of the digest acid will depend upon the composition of the clay, and for a clay containing $Al_2O_3$, 38.85 per cent; $SiO_2$ 40.22 per cent; $Fe_2O_3$, 3.83 per cent; $TiO_2$, 1.86 per cent; CaO, 0.23 per cent; MgO, 2.98 per cent; $Na_2O$, 0.10 per cent; $K_2O$, 0.49 per cent; and ignition loss, 8.55, the ratio should be of the order of 1 to 9. The quantity of acid supplied is usually about 4 to 5 times the quantity required for reaction with the aluminum content of the clay.

The clay charge is digested with the acid by heating in the digester for a period of from 3 to 5 hours and at a temperature of approximately 130° C. to 140° C., but preferably of 140° C., and may be agitated during heating. Sulfur dioxide gas from the aluminum sulfate washing system to be described later, is delivered to the digester 1. Under these conditions of heating, water vapor is distilled from the digester, and the acid therein in excess of that required to react with the clay is maintained at a concentration of approximately 48° Bé. The $SO_2$ gas in the digester aids in carrying off the water vapor. Alumina extraction from the clay is of the order of 95 to 98 per cent of the alumina present, and the concentration of aluminum sulfate dissolved in the acid will be about 4 to 8 pounds per gallon.

Upon completion of the digestion step the hot pulp is delivered to a residue washer 2 where it is thickened by settling. The temperature in the washer 2 is maintained by suitable means at 80° C. or higher, so as to retain the aluminum sulfate in solution. The thickened pulp is separated from the clarified acidic liquor and is delivered to residue washer 3 where it is washed either with water or with acidic wash liquor previously used for washing residue. But it may be preferred to wash the residue first with previously used acid wash liquor of approximately 48° Bé. concentration, and finally with fresh water. The wash liquor after 4 to 6 cycles of use may be utilized as a part of the feed acid to the clay digester, as shown in Fig. 1, in order to recover its aluminum sulfate and sulfuric acid values.

The clarified acidic liquor from washer 2 is delivered to crystallizer 4 where acidic aluminum sulfate is crystallized by cooling at a temperature of about 25° to 35° C. The crystals are monoclinic in habit and have the approximate composition $Al_2(SO_4)_3 \cdot 3H_2SO_4 \cdot 7H_2O$. The slurry of crystals formed in crystallizer 4 is delivered to filter 5 where they are separated from the digest acid by filtration and washed with acid from acid tank 6. The digest acid separated from the crystals is conducted from filter 5 and is returned to the clay digester 1, the acid purification still 20 to be more fully set forth in a later portion of this description, and residue washer 2, in proportions as required for maintenance of the balanced operation of the entire system.

Acid tank 6 and filter 5 comprise a portion of a washing system for the aluminum sulfate. The system also includes tanks 8, 10, 12 and filters 7, 9 and 11. The number of units in the washing system is illustrative and the operation of the invention is not restricted to any fixed number. The number of such units may be varied at will to suit the needs of the occasion. Each of the filters 5, 7, 9 and 11 preferably consists of a continuous rotary filter complete with pulper or puddler. In each filter-puddler unit the solid aluminum sulfate is puddled with acid from the corresponding acid tank 6, 8, 10 and 12, collected by the rotary filter drum, washed with additional acid, and finally delivered to the next successive filter unit. Acid for the last or finish washing in filter 11 is fresh acid produced in the acid recovery system of the process, to be taken up in greater detail later.

In the operation of the aluminum sulfate washing system, it is necessary that the wash acid be saturated with sulfur dioxide to reduce ferric sulfate to ferrous sulfate. Sulfur dioxide for this purpose is obtained from the acid recovery system as shown in Fig. 1.

The aluminum sulfate washing system eliminates the sulfates of other metals, for example, $FeSO_4$, $TiSO_4$, $CaSO_4$, $MgSO_4$, $NaSO_4$ and $K_2SO_4$, from the crude aluminum sulfate crystallized from the digest acid. Also, in the process of washing in this system, the initial acidic aluminum sulfate having the approximate composition $Al_2(SO_4)_3 \cdot 3H_2SO_4 \cdot 7H_2O$ is converted to the less acidic aluminum sulfate having the approximate composition $Al_2(SO_4)_3 \cdot H_2SO_4 \cdot 3H_2O$.

The washed aluminum sulfate is delivered to a preheater 13 where it is heated at a temperature of about 140° C. to 180° C. to convert it into substantially normal aluminum sulfate $Al_2(SO_4)_3$ with a minimum volatilization of sulfuric acid or sulfur oxides. By this treatment the salt will first dissolve. Thereafter on continued heating and as the temperature reaches 140° to 180° C. the acid will become concentrated and the normal salt will solidify and precipitate out. A supernatant liquor containing the most of the acid separates and may be removed by decantation. The liquid sulfuric acid from the decomposition of the acid salt $$[Al_2(SO_4)_3 \cdot H_2SO_4 \cdot 3H_2O \longrightarrow Al_2(SO_4)_3 + H_2SO_4 + 3H_2O]$$

which is thereby recovered is returned to the clay digestion system by means of the acid purification still 20.

The normal aluminum sulfate from the preheater is calcined to alumina in a suitable system 14, preferably comprising a rotary kiln. The decomposition of the aluminum sulfate to aluminum oxide in the calciner produces a mixture consisting of $SO_2$, $SO_3$ and $H_2SO_4$ as by-products.

The by-products from the decomposition of aluminum sulfate are handled in a conventional system 15, 16 and 17, in which $H_2SO_4$ is precipitated by electrostatic precipitation or other means; $SO_2$ is converted to $SO_3$ by catalytic oxidation with vanadium or platinum mass catalyst or other means. The $SO_3$ is absorbed in strong sulfuric acid and hydrated to $H_2SO_4$ which is diluted as required to form sulfuric acid of approximately 48° Bé. concentration.

A portion of the $SO_2$ produced by the decomposition of the aluminum sulfate is delivered to the acid tanks 6, 8, 10 and 11 for use in the washing of the aluminum sulfate as previously described and illustrated in Fig. 1.

An acid purification still 20 is provided to purify preferably about 10 per cent of the acid required for the digestion of each charge of clay. Acid is supplied to the still from the preheater 13 and the filter 5. Acid in this still is concentrated by evaporation of water, preferably under reduced pressure. The treating conditions are adjusted so as to produce a sulfuric acid solution of about 55° to 60° Bé. concentration. The concentration of the acid solution results in the precipitation of the metallic sulfates which are relatively soluble in acid solutions of the concentrations employed in carrying out this process but which are insoluble in acid concentrations of 55° to 60° Bé. The sulfate impurities are filtered from the purified acid in filter 21 and may be recovered as by-products of the process.

The process, as described above and as illustrated in accompanying Fig. 1 was operated continuously with successive batches of clay. The analyses of the clay charges and of the residues from successive treatments of clay are given in the following table:

TABLE

*Analyses of clay and insoluble residues*

|  | Analyses, per cent | | | | | | | | $Al_2O_3$ Extraction Per cent |
|---|---|---|---|---|---|---|---|---|---|
|  | $Al_2O_3$ | $SiO_2$ | $Fe_2O_3$ | $TiO_2$ | $CaO$ | $MgO$ | $Na_2O$ | $K_2O$ |  |
| Clay charge | 38.85 | 40.22 | 3.83 | 1.86 | 0.23 | 2.98 | 0.10 | 0.49 | |
| Residue 1 | 1.54 | 53.52 | 0.12 | 0.42 | 0.15 | 0.05 | 0.24 | 0.07 | 97.02 |
| Residue 2 | 3.99 | 59.86 | 0.25 | 0.80 | 0.31 | 0.05 | 0.31 | 0.12 | 93.09 |
| Residue 3 | 2.17 | 52.22 | 0.25 | 0.57 | 0.36 | 0.05 | 0.24 | 0.08 | 95.69 |
| Residue 4 | 2.74 | 54.78 | 1.24 | 1.54 | 0.20 | 0.17 | 0.05 | 0.10 | 94.82 |
| Residue 5 | 1.30 | 52.50 | 1.24 | 1.40 | 0.14 | 0.30 | 0.09 | 0.10 | 97.43 |
| Residue 6 | 1.92 | 57.32 | 0.50 | 1.16 | 0.40 | 0.24 | 0.16 | 0.33 | 96.53 |
| Residue 7 | 2.20 | 59.14 | 0.05 | 0.84 | 0.05 | 0.05 | 0.01 | 0.01 | 96.15 |
| Residue 8 | 1.03 | 61.04 | 0.05 | 0.94 | 0.05 | 0.05 | 0.09 | 0.01 | 98.25 |
| Residue 9 | 1.79 | 61.11 | 0.05 | 1.51 | 0.05 | 0.05 | 0.01 | 0.19 | 96.97 |

In the operations, the quantity of sulfuric acid (48° Bé.) used for digestion of clay and purification of aluminum sulfate was varied from about 1.75 gallons to 3.5 gallons per pound of clay, and could be kept within these limits by purifying the acid as described above.

In the operation of the process as described, alumina is obtained having approximately the following composition: $Al_2O_3$, 97 per cent; $Fe_2O_3$, 0.05 per cent; $SiO_2$, 0.03 per cent, $TiO_2$, 0.006 per cent; $Na_2O$, 0.05 per cent; and traces of $MgO$, $K_2O$ and $H_2O$.

The process is primarily intended for the recovery of alumina from aluminum silicate and equivalent minerals. However, it may also be applied to the recovery of silica and compounds of sodium, potassium, iron, titanium, calcium and magnesium.

The removal of metal salts by digestion of solutions of these salts and aluminum sulfate in sulfuric acid may be made either before or after the treatment of the solution with sulfur dioxide to reduce iron from ferric to ferrous state.

To those skilled in the art it will be apparent that various modifications in the process and accompanying flow sheet can be made without departing from the spirit and scope of the invention as defined in the appended claims.

What I claim is:

1. In the production of aluminum oxide by the conversion of the aluminum content of aluminum silicate containing metallic impurities to acid aluminum sulfate by the action of strong solutions of sulfuric acid, a method comprising purifying said acid aluminum sulfate by washing the same with a strong solution of sulfuric acid having a concentration of approximately 48° Bé. to retain said metallic impurities in solution in the form of sulfates, separating said washing solution from the purified aluminum sulfate and subsequently removing the same impurities from the solution by concentrating the solution to from 55° to 60° Bé. so as to precipitate the metallic sulfates therefrom, and removing the precipitate from the said solution.

2. In the production of aluminum oxide by the conversion of the aluminum content of aluminum silicate containing metallic impurities to acid aluminum sulfate by the action of strong solutions of sulfuric acid, a method comprising purifying said acid aluminum sulfate by washing the same in the presence of sulfur dioxide with a strong solution of sulfuric acid having a concentration of approximately 48° Bé. separating said washing solution from the purified aluminum sulfate and subsequently removing the said impurities from the solution by concentrating the solution so as to precipitate the metallic sulfates therefrom.

3. In the production of aluminum oxide by the treatment with sulfuric acid of aluminum silicate containing metallic impurities, a cyclic method comprising subjecting crushed air dried clay in a digester to the action of 48° Bé. solution of sulfuric acid at an elevated temperature for a sufficient period of time to convert substantially all the aluminum content of the clay to acid aluminum sulfate, separating the digest liquid from the solid residue by filtration, washing the residue first with a sulfuric acid solution of approximately 48° Bé., then with water, returning the acid wash solution to the digester, crystallizing acid aluminum sulfate from the digest liquid by cooling, separating the crystals from the digest liquid, by filtration, washing the crystals with 48° Bé. sulfuric acid solution in the presence of sulfur dioxide to remove impurities therefrom, conducting the purified crystals to a heating chamber to be heated at a temperature of from 140° to 180° C. to separate the sulfuric acid and water components to thus produce normal aluminum sulfate, separating the liberated sulfuric acid and water from the normal sulfate, then calcining the normal aluminum sulfate to decompose it to aluminum oxide and the oxides of sulfur, returning a portion of the acid solution from the crystal washing and filtering operations to the digester, and concentrating another portion of the acid solution together with acid from the heating chamber to a concentration of 55° to 60° Bé. to precipitate metallic sulfate impurities therefrom, and reusing the purified acid in the process, recovering the sulfur oxides and using a portion in the crystal washing operation and a portion in the digester and converting the remainder to sulfuric acid to be reused in the process.

4. In the production of aluminum oxide by the treatment with sulfuric acid of aluminum silicate containing metallic impurities, a cyclic method comprising subjecting crushed air dried clay in a digester to the action of a strong solution of sulfuric acid at an elevated temperature for a sufficient period of time to convert substantially all the aluminum content of the clay to acid aluminum sulfate, separating the digest liquid from the solid residue by filtration, washing the residue first with a strong sulfuric acid solution, then with water, returning the acid wash solution to the digester, crystallizing acid aluminum sulfate from the digest liquid by cooling, separating the crystals from the digest liquid, by filtration, washing the crystals with a strong sulfuric acid solution in the presence of sulfur dioxide to remove impurities therefrom, conducting the purified crystals to a heating chamber to be heated at a temperature sufficient to separate the sulfuric acid and water components without causing the formation of oxides, to thus produce normal aluminum sulfate, separating the liberated sulfuric acid and water from the normal sulfate then calcining the normal aluminum sulfate to decompose it to aluminum oxide and the oxides of sulfur, returning a portion of the acid solution from the crystal washing and filtering operations to the digester, and concentrating another portion of the acid solution together with acid from the heating chamber so as to precipitate metallic sulfate impurities therefrom, and reusing the purified acid in the process, recovering the sulfur oxides and using a portion in the crystal washing operation and a portion in the digester and converting the remainder to sulfuric acid to be reused in the process.

5. A method for purifying and converting acid aluminum sulfate having the approximate composition $Al_2(SO_4)_3 \cdot 3H_2SO_4 \cdot 7H_2O$ to normal aluminum sulfate, comprising washing said sulfate with a concentrated solution of sulfuric acid, separating the wash acid, and heating the washed acid sulfate to a temperature of 140° to 180° C. to liberate sulfuric acid and water and separating the sulfate from the liberated acid and water.

6. In the production of aluminum oxide by the treatment with sulfuric acid of aluminum silicate containing metallic impurities, a cyclic method comprising subjecting crushed, air dried clay in a digester to the action of a solution of sulfuric acid of approximately 48° Bé. concentration at an elevated temperature for a sufficient period of time to convert substantially all the aluminum content of the clay to acid aluminum sulfate having the approximate composition $$Al_2(SO_4)_3 \cdot 3H_2SO_4 \cdot 7H_2O$$

separating the digest liquid from the solid residue, washing the residue first with a sulfuric acid solution of approximately 48° Bé., then with water, returning the acid wash solution to the digester, crystallizing the acid aluminum sulfate from the digest liquid by cooling, separating the crystals from the digest liquid, washing the crystals with a sulfuric acid solution of approximately 48° Bé. concentration in the presence of sulfur dioxide, conducting the washed crystals to a heating chamber to be heated at a temperature of from 140° to 180° C. to form normal aluminum sulfate, separating the liberated sulfuric acid and water from the normal sulfate then calcining the normal aluminum sulfate to decompose it to aluminum oxide and oxides of sulfur, returning a portion of the acid solution from the crystal washing operation to the digester, and concentrating another portion of said acid solution together with acid from the heating chamber to a concentration of 55° to 60° Bé. to precipitate impurities therefrom, and reusing the purified acid in the process, recovering the sulfur oxide and using a portion in the crystal washing operation and a portion in the digester and converting the remainder to sulfuric acid to be reused in the process.

ERWIN C. HOEMAN.

REFERENCES CITED

The following references are of record in the file of this patent:

UNITED STATES PATENTS

| Number | Name | Date |
|---|---|---|
| 1,538,837 | Moxham | May 19, 1925 |
| 1,607,279 | Hultman | Nov. 16, 1926 |
| 2,249,761 | Hixon | July 22, 1941 |
| 2,280,508 | Bousquet et al. | Apr. 21, 1942 |

FOREIGN PATENTS

| Number | Country | Date |
|---|---|---|
| 805,325 | France | Nov. 17, 1936 |

OTHER REFERENCES

Tilley et al.: "Acid Processes for the Extraction of Alumina," U. S. Bureau of Mines Bulletin No. 267, pp. 58 and 59 (1927).

Mellor: "Inorganic and Theoretical Chemistry," vol. 5, p. 336, Longmans, London (1924).

Gmelin-Kraut, Handbuch der Anorganischen Chemie, vol. 2, part 2, Heidelberg (1909), p. 164.